United States Patent
Ba-Tis et al.

(10) Patent No.: US 9,529,470 B2
(45) Date of Patent: Dec. 27, 2016

(54) TOUCH-SENSITIVE INTERFACE MODULE

(71) Applicants: Faez Ba-Tis, Toronto (CA); Ridha Ben-Mrad, Toronto (CA)

(72) Inventors: Faez Ba-Tis, Toronto (CA); Ridha Ben-Mrad, Toronto (CA)

(*) Notice: Subject to any disclaimer, the term of this patent is extended or adjusted under 35 U.S.C. 154(b) by 0 days.

(21) Appl. No.: 15/216,292

(22) Filed: Jul. 21, 2016

(65) Prior Publication Data

US 2016/0328068 A1 Nov. 10, 2016

Related U.S. Application Data

(63) Continuation-in-part of application No. 14/449,544, filed on Aug. 1, 2014, now Pat. No. 9,306,475.

(51) Int. Cl.
| | |
|---|---|
| *G06F 3/041* | (2006.01) |
| *G06F 1/16* | (2006.01) |
| *G06F 3/044* | (2006.01) |
| *G01L 5/00* | (2006.01) |
| *H02N 1/00* | (2006.01) |

(52) U.S. Cl.
CPC ........... *G06F 3/0414* (2013.01); *G01L 5/0038* (2013.01); *G06F 1/1652* (2013.01); *G06F 3/044* (2013.01); *G06F 3/0416* (2013.01); *H02N 1/00* (2013.01); *H02N 1/002* (2013.01); *H02N 1/004* (2013.01); *H02N 1/006* (2013.01); *H02N 1/008* (2013.01); *G06F 2203/04102* (2013.01)

(58) Field of Classification Search
CPC ...... G06F 3/0414; G06F 3/044; G06F 3/0416; G06F 1/1652; G06F 2203/04102; G01L 5/0038; H02N 1/00; H02N 1/002; H02N 1/004; H02N 1/006; H02N 1/008
USPC .......................... 345/173–175; 310/300–309
See application file for complete search history.

(56) References Cited

U.S. PATENT DOCUMENTS

| | | | |
|---|---|---|---|
| 6,384,952 B1* | 5/2002 | Clark | G02B 26/06 359/200.6 |
| 2014/0125950 A1* | 5/2014 | Shimada | G02B 26/0841 351/206 |

* cited by examiner

*Primary Examiner* — William Boddie
*Assistant Examiner* — Saifeldin Elnafia
(74) *Attorney, Agent, or Firm* — Nasser Ashgriz; UIPatent Inc.

(57) ABSTRACT

A touch-sensitive interface module that is able to provide 3-dimensional information about a touch by a user is disclosed. The touch-sensitive interface can detect the x-y position and the amount of the force applied on the interface. It comprises of a flexible display panel, an array of MEMS capacitive force sensors, each of which is electrically addressable and/or a circuit board of electrical connections. The force sensors comprise of a piston-tube electrode configuration that allows for easy to detect capacitive changes even when a small force is applied.

14 Claims, 11 Drawing Sheets

TOUCH-SENSITIVE INTERFACE MODULE

RELATED APPLICATIONS

This application repeats a substantial portion of prior application Ser. No. 14/449,544 filed on Aug. 1, 2014 and U.S. Pat. No. 9,306,475 B1, issued Apr. 5, 2016, and adds and claims additional disclosure not presented in the prior application. Since this application names the inventor or at least one joint inventor named in the prior application, it may constitute a continuation-in-part of the prior application.

FIELD OF THE INVENTION

The invention relates to the field of touch-sensitive electronic interfaces that are used in a variety of consumer electronic devices that receive an input from a user using a finger touch or an object.

BACKGROUND OF THE INVENTION

Current electronic devices utilize touch-sensitive screens to receive an input from a user. Most of these screens have the ability to detect either the x-y position of the finger touched the screen or the amount of the force applied. Projected or surface capacitive touch screens are widely used in such electronic devices to sense the x-y position of the fingers. However, they are only responsive to capacitive objects such as human fingers or a stylus or any other object that is capacitive. But such screens do not have the capability to detect the amount of the force applied, limiting the user experience. Other capacitive touch screens are meant to provide 3-dimensional information such as the inventions disclosed in US20120013571 A1 and US8169416B2. However, these inventions are based on parallel plate capacitor configurations in which the stroke of the plate is limited to one third of the initial gap between the capacitor plates. To make such a configuration highly sensitive, the gap between the plate electrodes has to be small; which in turn limits the dynamic range of the sensor in terms of the range of the force applied.

Piezoresistive touch screens offer the ability to detect the x-y position and the amount of the force applied. However, such technologies suffer from low sensitivity when the forces applied are limited to a small range, such as when a finger touch is applied. In addition, these piezoresistive touch sensors are sensitive to temperature changes. These type of touch screens are also complex in structure as they might contain liquid cells. An example of such screens is presented in US Provisional Patent Applications No. US20130096849 A1, 2014/0007705 A1, and US 20150138112 A1.

The present invention of a touch-sensitive interface module, which is based on a MEMS piston-tube capacitive force sensor, is able to overcome the limitations of conventional capacitive touch screens.

SUMMARY OF THE INVENTION

The present invention discloses a touch-sensitive interface based on MEMS capacitive force sensors that can detect an input force by utilizing the MEMS electrostatic piston-tube electrode configuration that was previously disclosed in U.S. patent application Ser. No. 15/091,259 and U.S. Pat. No. 9,306,475 B1 and PCT/IB2014/001498, which are incorporated by reference herein below.

The main features of the present touch capacitive screen are related to the unique configuration of the piston-tube force sensor. These features include the high sensitivity of the sensor for force detection and its ability to measure a wide range of the input force. The high sensitivity of the piston-tube electrode configuration is due to the fact that any small displacements of the rotor corresponding to an applied mechanical force/pressure induce measurable changes in the capacitance of the structure which can be detected by the sensing readout circuit. The piston-tube electrode configuration is also able to detect a wide range (pN to mN) of input force as the high stiffness of the sensor structure (thick springs) and large stroke of the rotor of the sensor (in the ranges of 10's of μm) enables the sensor to measure large forces and over a wide range.

Mechanical stoppers are also easily made during the fabrication of the touch-sensitive module so that it can withstand forces that are beyond the measurable range of the input force without causing the sensor to be damaged or short circuited.

An example of the present touch-sensitive interface based on the MEMS piston-tube capacitive force sensor consists of a flexible display panel, an array of MEMS piston-tube capacitive sensors and/or Flexible Circuit Board (FCB)/Printed Circuit Board (PCB). The display panel could be an LCD (in which the force sensitive interface is attached to the back-light layer of the LCD) or an LED screen that is flexible enough to transmit the force from the finger or any object applied to the screen. The array of the MEMS piston-tube force sensors could have two forms. In one form, all of the rotors (moving electrodes) of the sensors are electrically connected forming a single common electrode, and the stators (fixed electrodes of the force sensors) are electrically isolated. In this case, a flexible circuit board, or a printed circuit board, is used to achieve the electrical routing between the stators of all sensors and the capacitive read-out circuit. In the other form, all of the stators of the sensors are electrically connected forming a single common electrode, and the rotors (moving electrodes) are electrically isolated by utilizing an insulating layer at the bonding interface between the rotor plate and stator plate. Capacitive read-out circuits are used to detect the changes in capacitance in each individual sensor, and algorithms are used to identify the activated sensor and the amount of the force applied; hence, 3-dimensional information is provided about the user touch.

Each piston-tube capacitive force sensor comprises a lower structure which forms the stator, an upper structure which forms the rotor that is attached to the substrate through springs, and the force contact platform that is placed on the moving rotor of each sensor and beneath the flexible display panel of the touch screen. When an input force is applied to flexible display, the force contact platform transmits the mechanical force, and the rotor of the sensor moves downward leading to a change in the capacitance between the sensing piston and tube electrodes.

The sensing electrodes (pistons) in the stator of each sensor could be electrically connected (having a single polarity) to measure only the magnitude of the force, or could be divided into a number of piston arrays electrically isolated from each other to sense the magnitude and the position of a concentrated force relative the rotor of each sensor. Different structures of the piston-tube electrode configuration designs that are disclosed in the U.S. Pat. No. 9,306,475 B1 and PCT/IB2014/001498 could be used to sense the force.

It will be readily apparent to the one with ordinary skills in the art that this invention could be altered in many ways, used in many applications for force measurement without departure from the soul of the invention. It will also be readily apparent to the one with ordinary skills in the art that this force sensor could be used as displacement sensor as the applied force is proportional to the springs' stiffness and the displacement; once the force is known, the displacement is determined.

One object of the present invention is to provide a touch-sensitive screen that is able to detect a small acting force, in the range of hundreds of micro-Newtons, and also a large input force, in the range of 10's of milli-Newtons. The present device can achieve this due to the high sensitivity of the piston-tube electrode configuration of each of its force sensors in its array, and to the large stroke that the rotor can travel, and to the high stiffness of the flexure mechanism of the rotor for each of these sensors.

Another object of the present invention is to provide a screen that is able to detect the touch force of any object (finger, stylus, pen, etc.) as they do not require a capacitive object to operate.

Another object of the present invention is to provide a touch sensitive screen that the capacitance changes linearly with respect to the applied force. Therefore, more information can be transferred by the amount of the force applied.

Another object of the present invention is to provide sensors that can withstand the application of an input force that far exceeds their range. This is achieved by the use of mechanical stoppers in the sensor structure.

Another object of the present invention is to provide a high resolution by scaling down the size of each of the MEMS piston-tube capacitive force sensors in the sensor array without significantly compromising the sensitivity of each of these sensors.

BRIEF DESCRIPTION OF DRAWINGS

Embodiments herein will hereinafter be described in conjunction with the appended drawings provided to illustrate and not to limit the scope of the claims, wherein like designations denote like elements, and in which:

DETAILED DESCRIPTION OF THE INVENTION

The preferred embodiment of the touch-sensitive interface module 120 based on the MEMS capacitive piston-tube force sensor is illustrated in FIG. 1-7. The touch-sensitive interface module consists of a flexible display panel 121, a touch-sensitive interface 110, and/or signal routing circuit that could be printed or a flexible circuit board 122 (FIG. 1E).

7

Figure 1A:
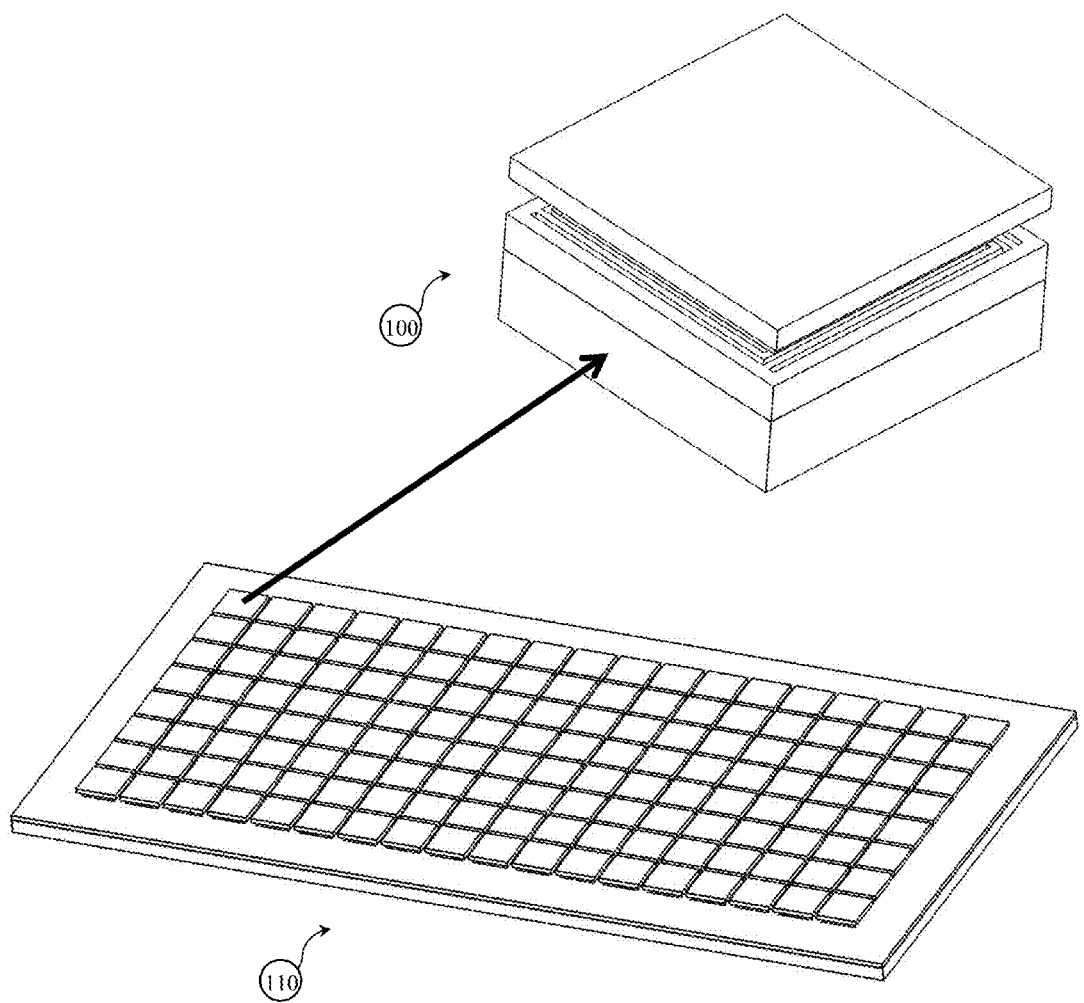
FIG. 1A shows a perspective view of a touch-sensitive interface based on the MEMS capacitive piston-tube force sensor, according to an example embodiment of the present invention.
Figure 1B:
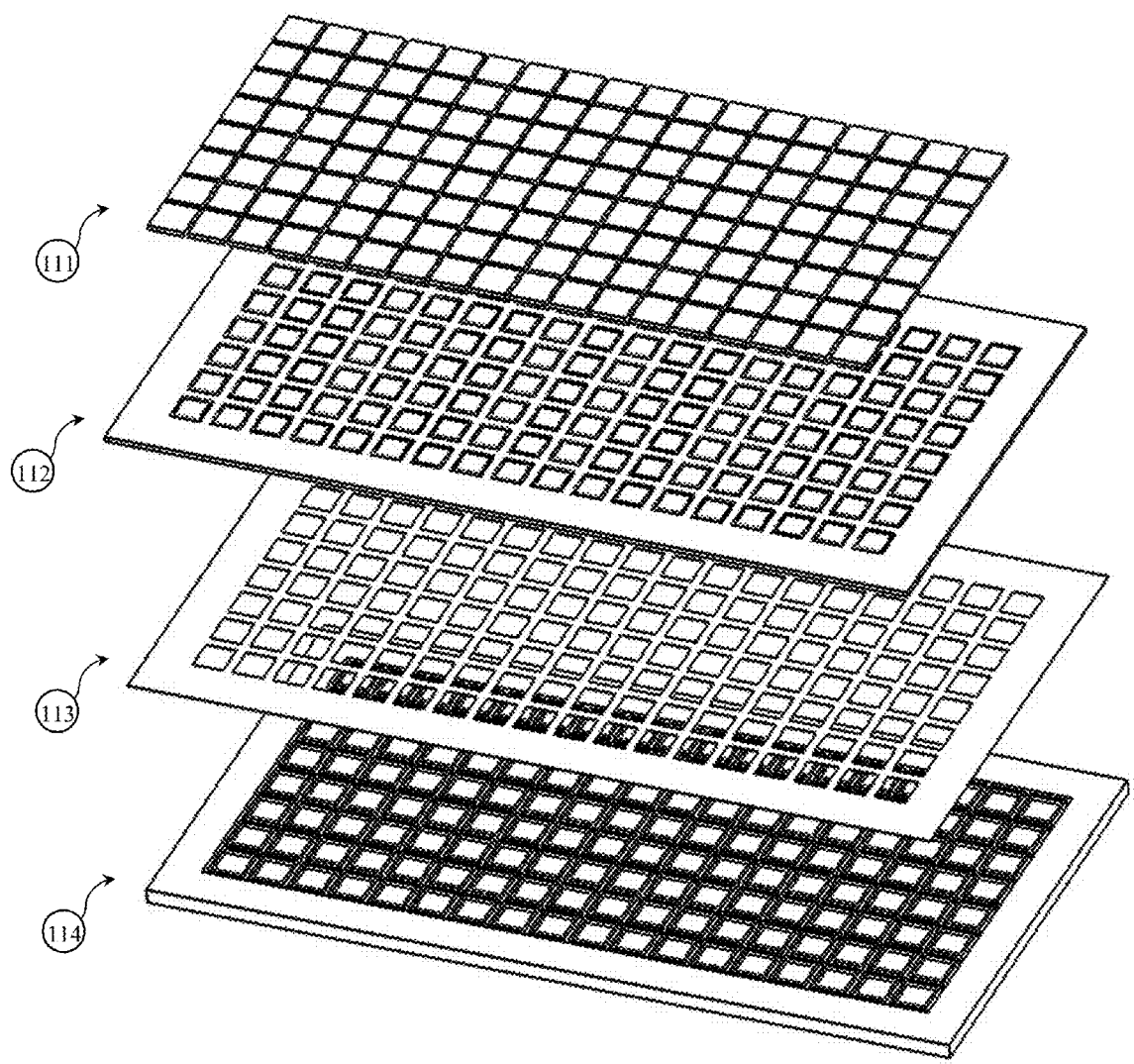
FIG. 1B shows an exploded perspective view of the touch-sensitive interface based on the MEMS capacitive piston-tube force sensor shown in FIG. 1A.

FIG. 1A-B illustrate the touch-sensitive interface 110 containing an array of MEMS capacitive piston-tube force sensors 100, and it comprises a stator (fixed electrodes) plate 114, electrical insulation layer 113, rotor (moving electrodes) plate 112, and/or force contact platforms 111. The stator plate contains the fixed electrodes of the sensors that are electrically insulated from each other by means of etching such as Deep Reactive Ion Etching (DRIE) through the whole stator plate or any other etching method. The insulating layer 113 provides the electrical isolation between the stator and rotor plates of the interface. The rotor plate is a common electrode between all of the sensors in the interface. The force contact platforms are used to transmit the force from the flexible display to the rotors (moving electrodes) of the sensors.

Figure 1C:
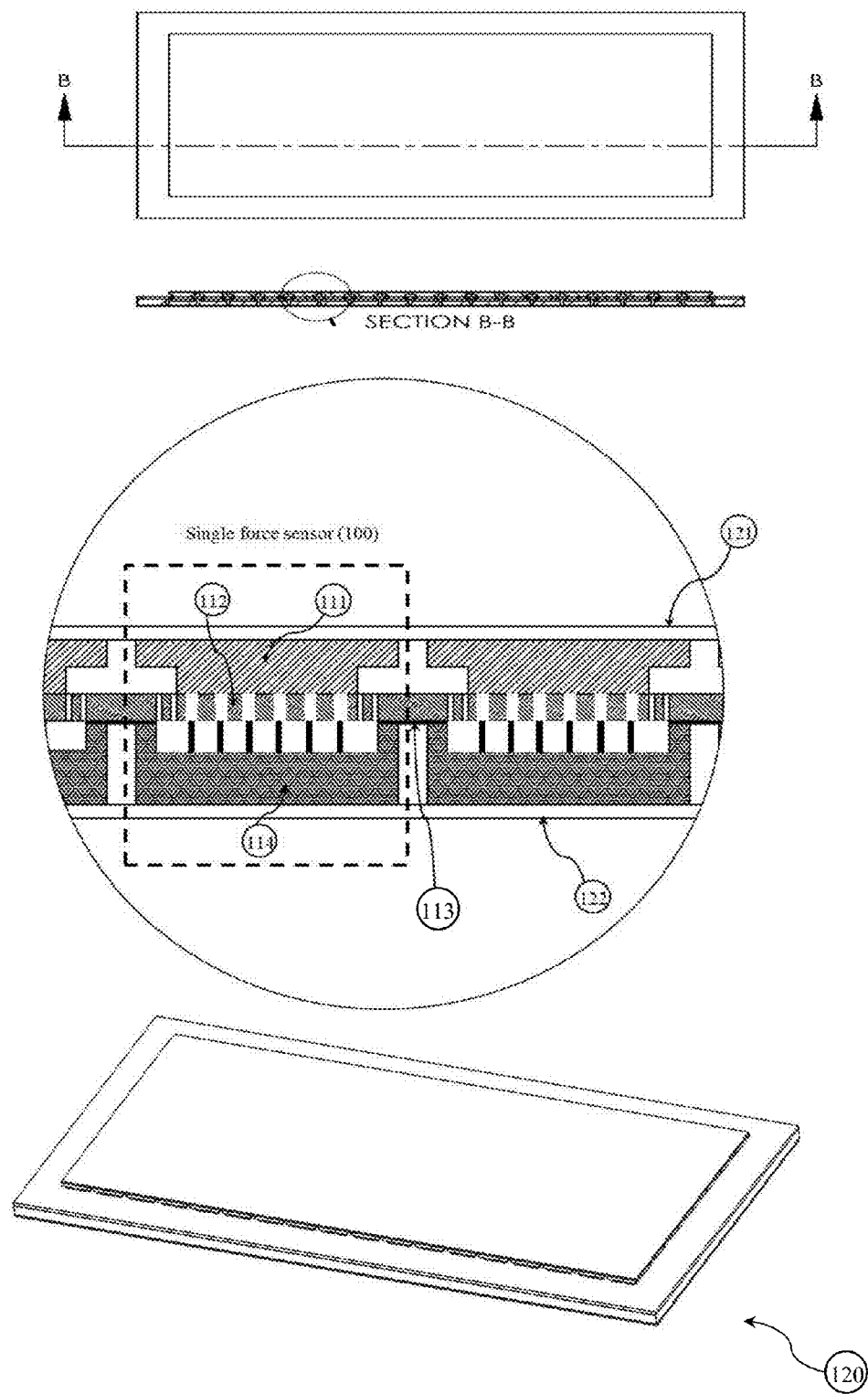
FIG. 1C shows a top, cross-section, a detailed, and perspective view of the touch-sensitive interface module using the common rotor and electrically insulated stators configuration based on the MEMS capacitive piston-tube force sensor, according to an example embodiment of the present invention.
Figure 1D:
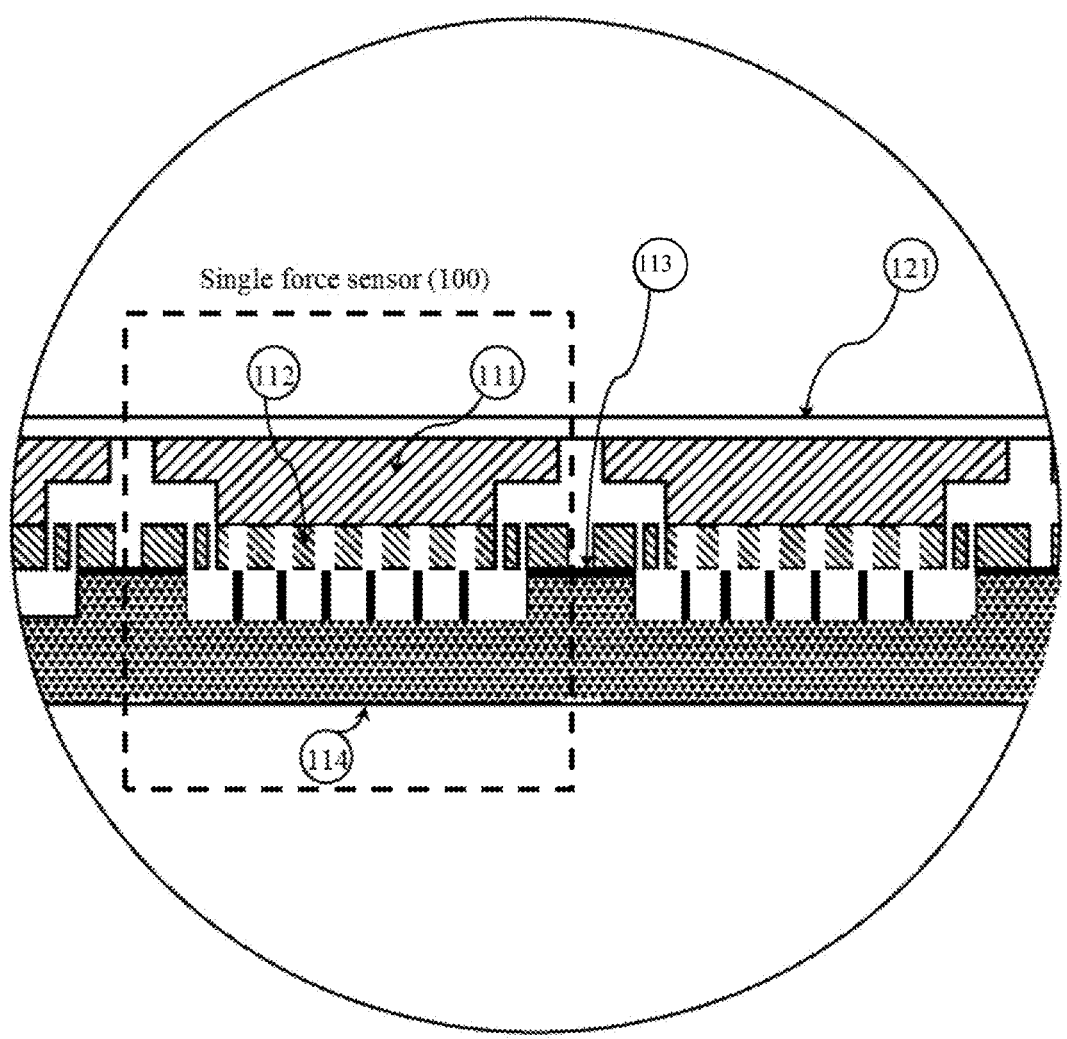
FIG. 1D is a cross-sectional view of the touch-sensitive interface module using the common stator and electrically insulated rotors configuration based on the MEMS capacitive piston-tube force sensor, according to an example embodiment of the present invention.
Figure 1E:
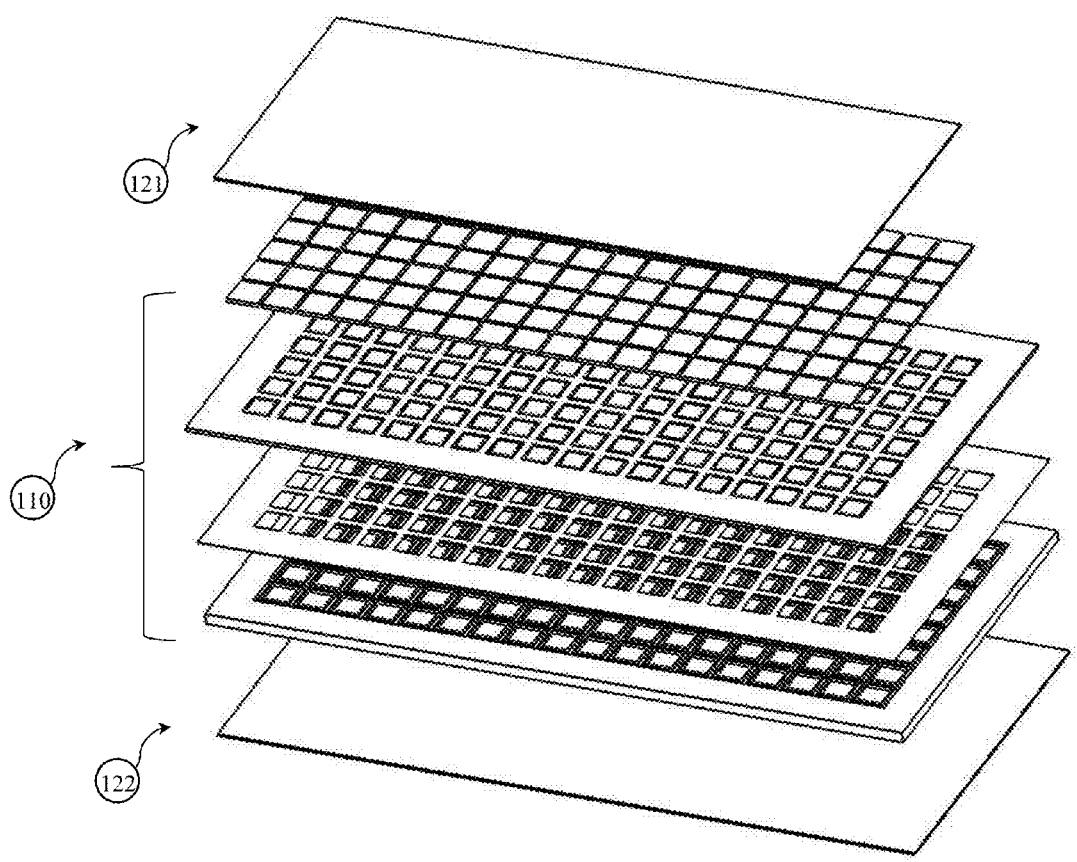
FIG. 1E shows an exploded perspective view of the touch-sensitive interface module based on the MEMS capacitive piston-tube force sensor shown in FIG. 1C.
Figure 1F:
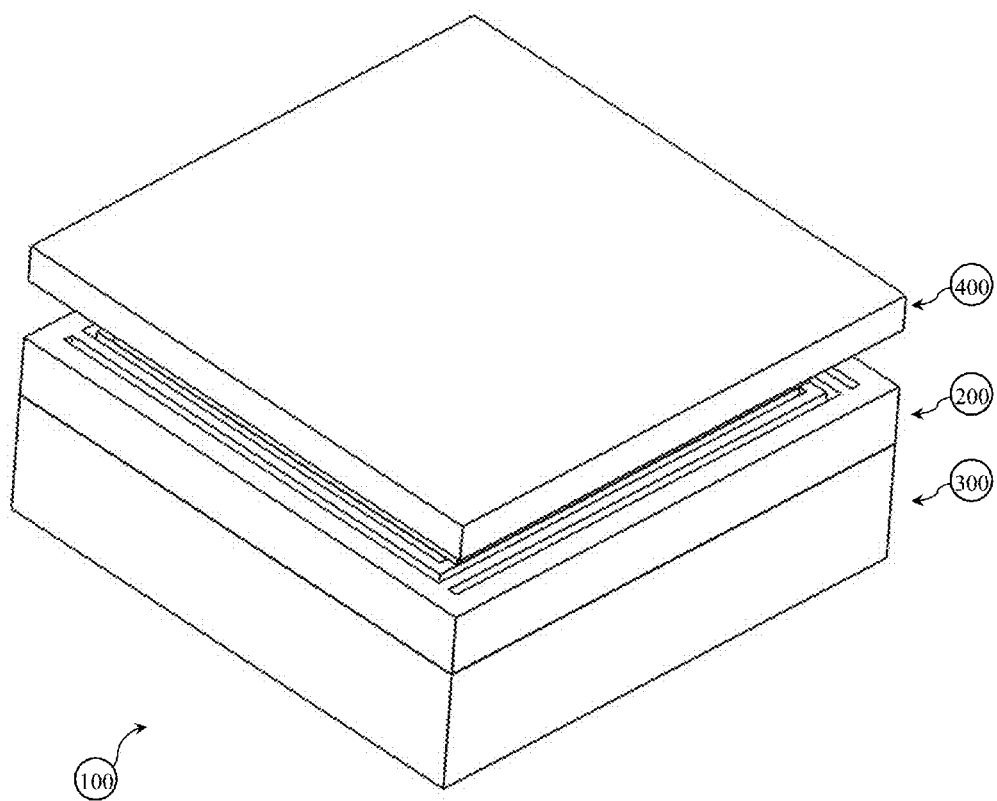
FIG. 1F shows a perspective view of a MEMS capacitive piston-tube force sensor.
Figure 1G:
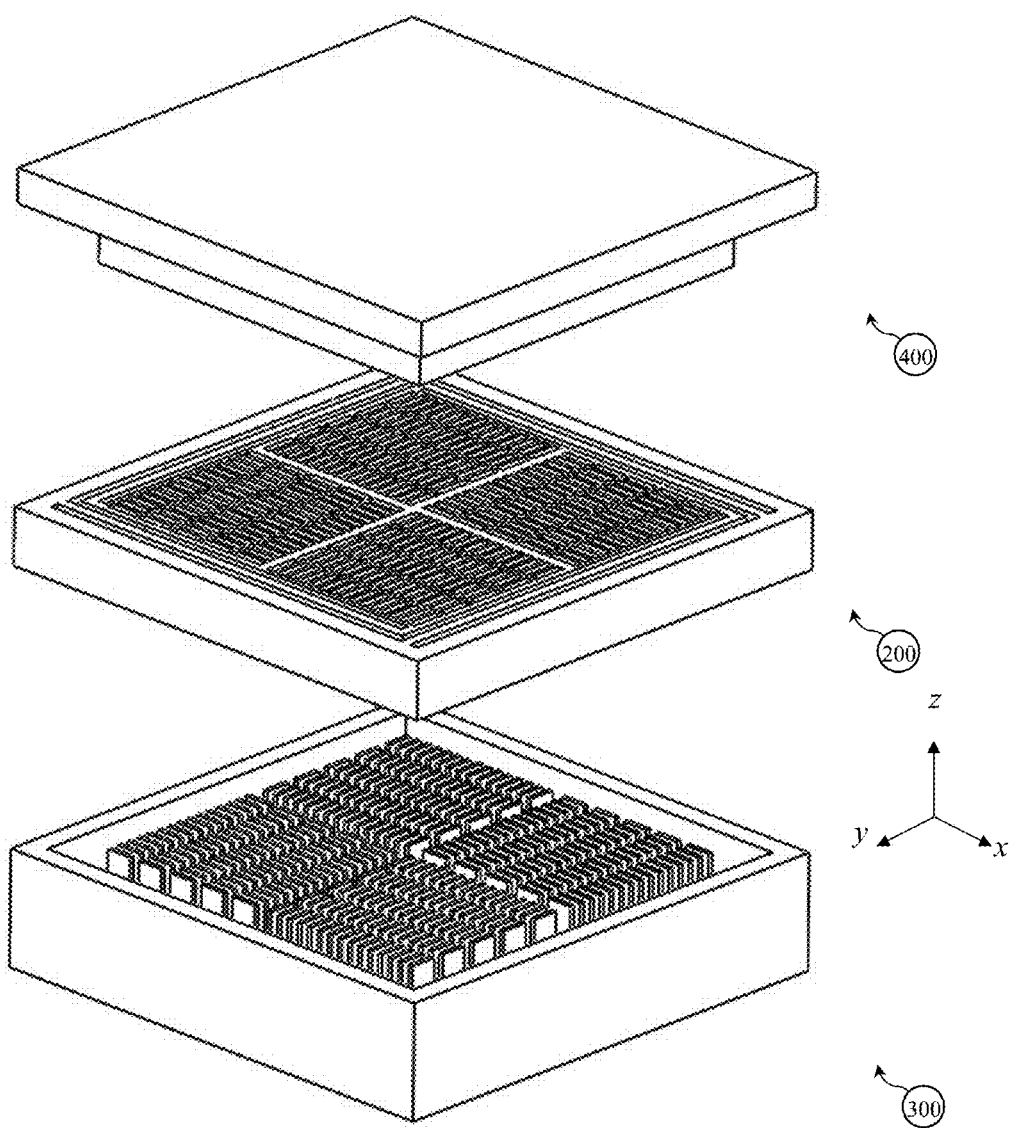
FIG. 1G shows an exploded perspective view of the MEMS capacitive piston-tube force sensor shown in FIG. 1F.

The touch-sensitive interface module 120 is further illustrated in FIG. 1C-E. It consists of the flexible display 121 that could be an LCD or LED screen. This flexible display transmits the user inputs from the user to the force contact platforms. An FCB or PCB 122 is used to provide electrical connections to the individual stators (fixed electrodes) of the sensors.

There are two configurations of the electrical insulation and connection between the moving electrodes and the fixed sensing electrodes. The first, shown in the cross sectional view in FIG. 1C, is the common rotor and electrically insulated stators configuration. In such configuration, the stators (fixed electrodes) of all of the force sensors are electrical insulating form each other and the rotors (moving electrodes) are all electrically connected forming a single electrode. The electrical insulation between the fixed sensing electrodes is achieved by means of etching such as Deep Reactive Ion Etching (DRIE) through the whole stator plate or any other etching method. The insulating layer 113 provides the electrical isolation between the stator and rotor plates of the interface, and also between the individual stators (fixed sensing electrodes). In this case (common rotor and electrical insulated stators), a flexible board circuit or PCB 122 is needed to be attached to the backside of the stator plate to provide the electrical routing to the separated stators (fixed electrodes).

The second is the common stator and electrically insulated rotors configuration. Such configuration is shown in FIG. 1D and is achieved by electrically insulating the rotors (moving electrodes) of each force sensor from each other by means of DRIE. The fixed sensing electrodes are all connected form a single electrode. In such configuration, there is no need of the FCB or PCB to be attached to the back of the touch interface as the rotor plate is utilized to provide electrical routings to the individual rotors (moving electrodes) by means of DRIE of the rotor plate.

Figure 2:
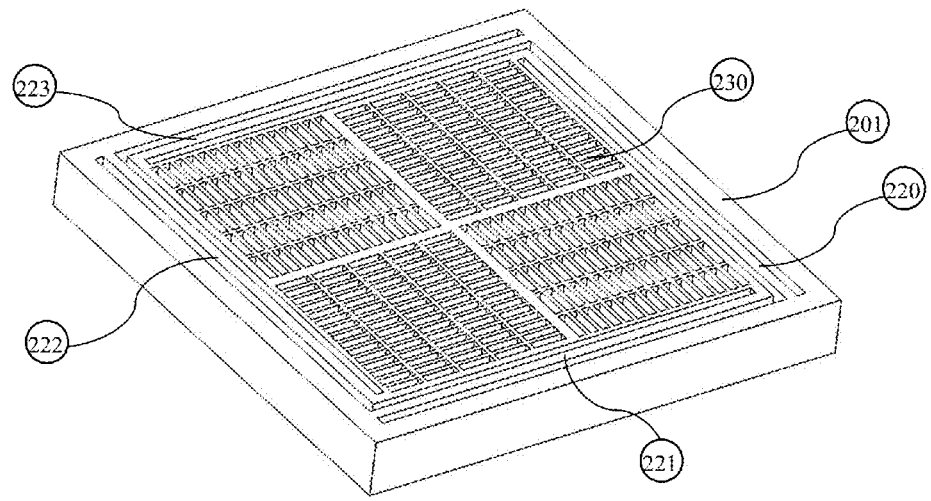
FIG. 2 is a perspective view illustrating the upper structure (the rotor, springs, and outer periphery) of the piston-tube capacitive force sensor.
Figure 3A:
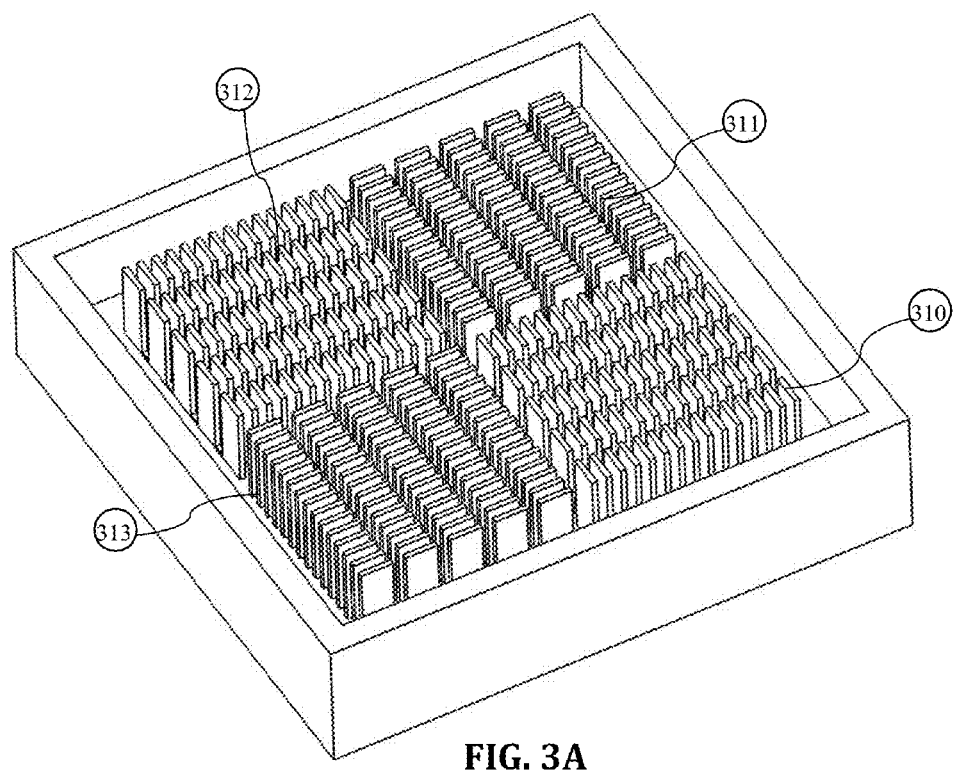
FIG. 3A is a perspective view illustrating the lower structure (stator) of the piston-tube capacitive force sensor.

The preferred embodiment of the individual MEMS capacitive piston-tube force sensors 100 is illustrated in FIG. 1-7. Each sensor unit comprises a lower structure 300 that forms the stator, an upper structure 200 that houses the rotor 230 and mechanical springs 220, 221, 222, 223, and a force contact platform 400. The lower structure 300 is shown in FIG. 3, and it forms a plurality of rectangular-shaped pistons (teeth) 310, 311, 312, 313, and the upper structure 200 is shown in FIG. 2, and it houses the rotor which consists of a plurality of rectangular-shaped tubes (openings) 230, that correspond to the pistons in the lower structure.

Figure 3B:
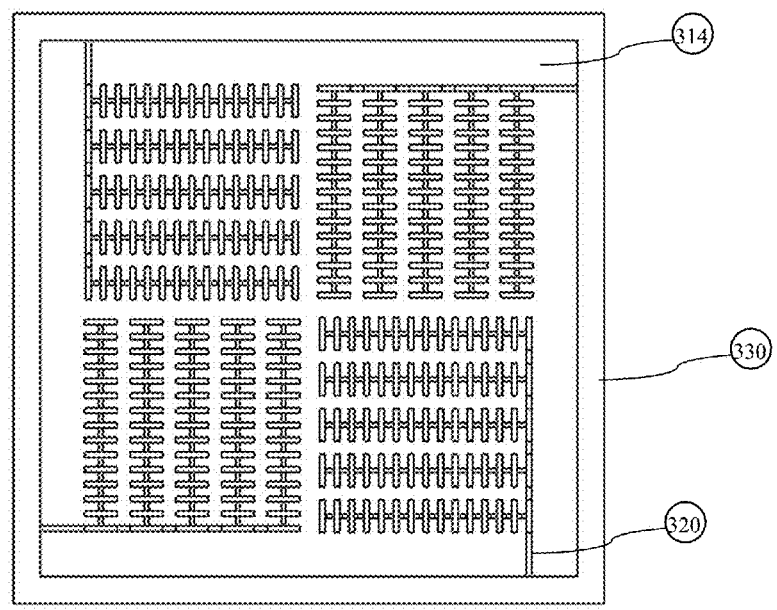
FIG. 3B is a perspective view illustrating the small thickness routing layer that connects the pistons in each sub-array in the lower structure (stator) of the piston-tube capacitive force sensor.

The pistons could form one or multiple sensing electrodes (preferably four), and they protrude vertically towards the upper structure and extend horizontally along the two in-plane axes (x and y). Each sensing electrode, within a single sensor, is electrically isolated from other sensing electrodes by utilizing the Buried Oxide (BOX) layer 314 of an SOI wafer or any other dielectric (i.e. insulation) layer. The division of the pistons into multiple arrays enables the detection of the force magnitude as well as force position with respect to the rotor when the force is concentrated. When the applied force is distributed and the magnitude of the force is only required to be sensed, all pistons are electrically connected and there is no need for the insulation layer 314 beneath the pistons, and the insulation layer 113, refer to FIG. 1B, between the stator plate and rotor plate will be utilized to provide the electrical separation between the stator and rotor of each sensor. The pistons within each single group (sensing electrode) are electrically connected to each other via a small thickness (height) layer 320 forming a single capacitor with the moving (common) electrode in the upper structure. It will be readily clear to the one with ordinary skills in the art that this layer 320, shown in FIG. 3B, is connected to the outer fixed periphery of the sensor 330 which is divided into different electrical pads by means of DRIE etching up to the insulating layer.

Another way of achieving the electrical insulation between the groups of pistons within the stator of each force sensor is by a back DRIE etching step through the whole stator plate up to the insulating layer 113 located in the bonding interface between the stator and rotor plates.

The tubes 230 form the moving electrode, which is a common electrode that in conjunction with the lower sensing electrodes 310, 311, 312, 313 make up the capacitors. The tubes are rectangular through holes, and they are vertically aligned with the pistons (sensing electrodes). The cross-section of the tubes is larger than that of the pistons so that the pistons penetrate along the tubes during the application of the force. The tubes usually have height (thickness) less that the pistons such that they fully engage without causing short circuit during the engagement of the pistons and the tubes while sensing. The moving structure containing the tubes is attached to the outer fixed periphery 201 of the sensor by multiple supporting springs 220, 221, 222, 223.

The force contact platform 400 is placed on the rotor of the sensor and could be made of any solid materials; light weight materials such as glass or plastic is preferable. A glass force contact platform could be attached to the rotor by means of ionic bonding during the fabrication of the sensor or by an adhesive. The force contact platform provides a means for the force transmission form the display panel to the rotor and also works as a mechanical stopper for the rotor during the application of an input force that exceeds the range of the sensor or severe shocks.

Figure 4:
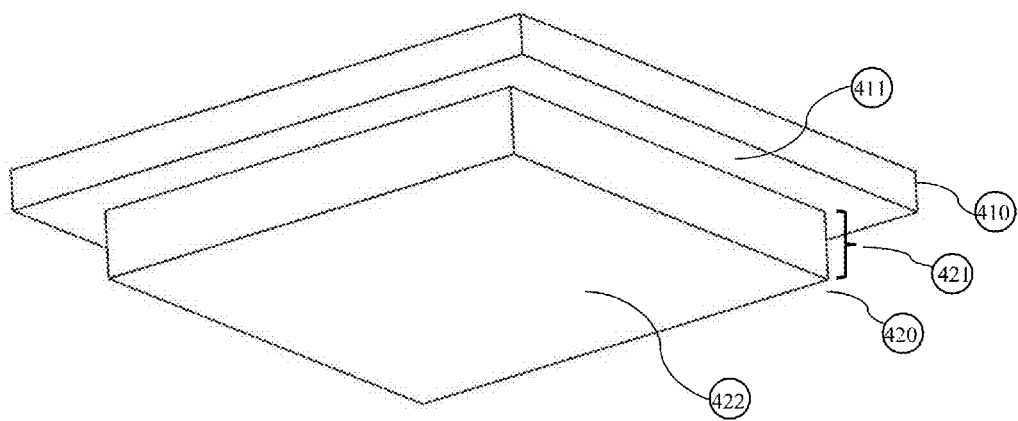
FIG. 4 is a perspective view illustrating the force contact platform that forms the foundation on which the input force is applied.

The force contact platform of each force sensor consists of two parts: the upper 410 and lower 420 as shown in FIG. 4. The bottom face 422 of the lower part is designed to fit the area of the moving rotor and has a height 421 which is equal to the maximum translation stroke of the moving rotor. The upper part 410 is larger in area than the lower part and could be set equal to the area of the whole force sensor unit to provide a large fill factor for the array of the sensors beneath the display panel. The upper part limits the motion of the rotor to the desired maximum translation or rotation stroke to avoid any short circuit between the pistons and tubes and also to prevent the sensor from being destroyed when forces that exceed the maximum force the sensor can handle are applied.

Figure 5:
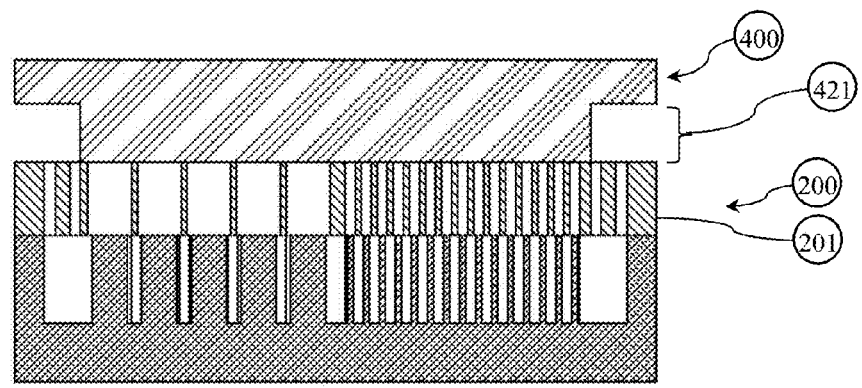
FIG. 5 shows a cross-sectional view illustrating the piston-tube capacitive force sensor at rest, no input force is applied.
Figure 6:
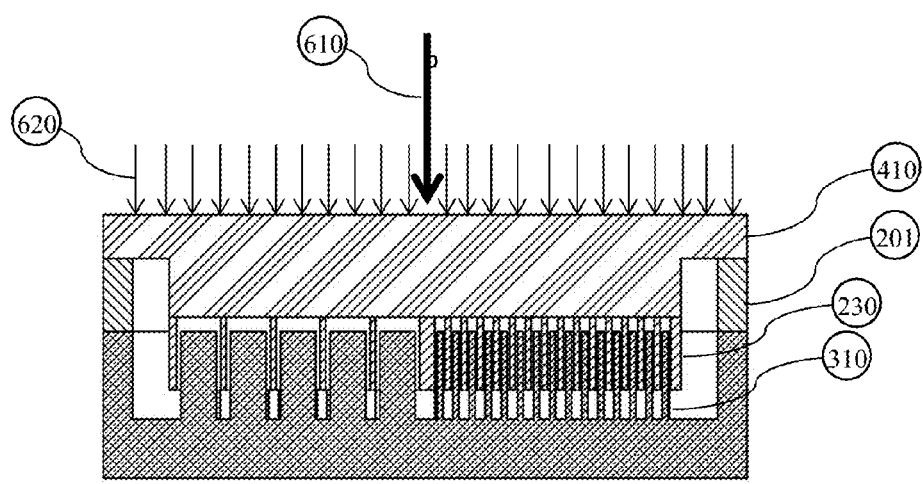
FIG. 6 shows a cross-sectional view illustrating the piston-tube capacitive force sensor during the application of an input force, concentrated at the center of the rotor or distributed over the entire rotor, on the force contact platform.

When no input force is applied, the rotor is at rest as shown in FIG. 5. When an external mechanical force (concentrated 610 at the center of the rotor or distributed 620 over the entire rotor), please refer to FIG. 6, is applied towards the force contact platform via the flexible display, (i.e. the negative direction of the z-axis), the relative engagement of the moving structure (tubes) and the lower structure (pistons) increases. The change of capacitance between the moving electrode (tubes) and the sensing electrodes (pistons) is detected by the capacitive read-out circuit. Hence the force can be measured.

The upper part 410 of the force contact platform works as a mechanical stopper when the rotor 230 of the sensor reaches the maximum stroke. The bottom surface 411 of this upper part hits the outer fixed periphery 201 of the sensor at the maximum stroke before the bottom surface of the rotor hits the lower structure. This is shown in FIG. 6. Such mechanism protects the actuator against large forces that exceed the capacity (i.e. range) of the sensor and prevents short circuits between the upper and lower structures.

Figure 7:
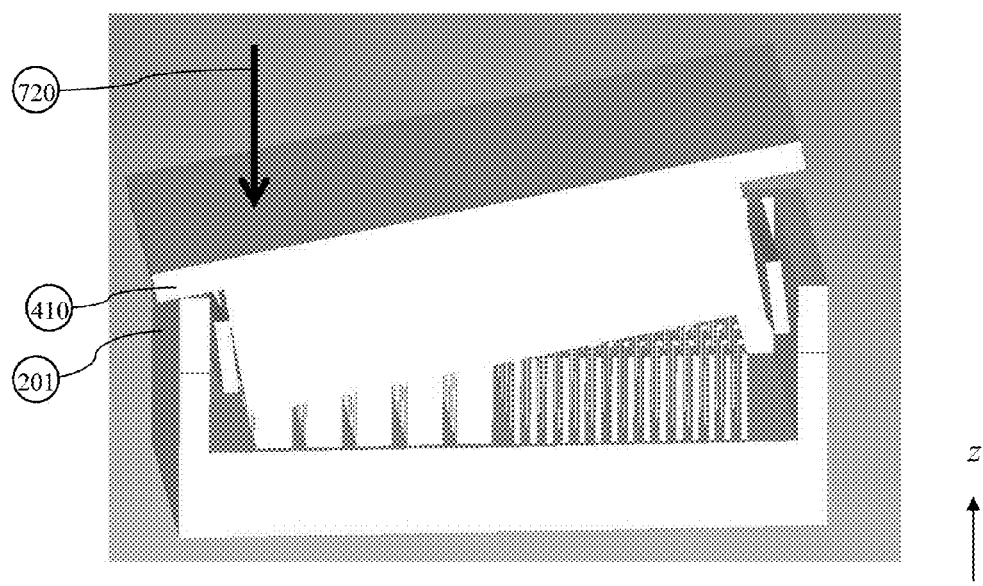
FIG. 7 shows a cross-sectional view illustrating the piston-tube capacitive force sensor during the application of an eccentric concentrated force on the rotor.

When an eccentric external concentered force 720, refer to FIG. 7, or a distributed force that can be represented through an equivalent eccentric external concentrated force also as shown by 720 is applied, the relative motion of the moving electrode (tubes) with respect to the fixed electrodes (pistons) are rotations about the in-plane axes. The resulting change in the engagement of the tubes and the corresponding pistons is largely concentrated in one half of the force sensor structure leading to a change in the capacitance which can be detected by the read-out circuit. Thus, the quadrant to which the force is applied can be known. The upper part 410 of the force contact platform also works as a mechanical stopper as this part hits the outer fixed periphery before the inner walls of the tubes hits the outer walls of the pistons. It would be readily apparent to the one who is skilled in the art that the dimensions of the pistons and tubes in FIG. 7 are not real as they are drawn only for illustration purposes. In a real design, a consideration is taken for the size of the horizontal gaps between the walls of the pistons and tubes such that the inner walls of the tubes do not touch the outer walls of the pistons when the maximum angle of rotation is reached.

The eccentric external force could represented by the finger touch when the force sensor is relative large as opposed to the size of the finger print. In such case, one single force sensor could be used to provide four inputs from the user, i.e. position of the finger could be detected in each of the four corners of the sensor separately. The present device can be programmed to assign several functions to each MEMS sensor according to the penetration depth of the tubes and pistons, as well as location of the touch on each sensor. Since the height of the pistons and tubes are relatively large, more than two functional can be easily assigned for each sensor.

The configuration of the springs holding the moving structure could be designed in many ways as it will be clearly apparent to one who is skilled in the art. One may use suspension springs that extend radially to support the tubes. Another preferred configuration of springs is that the springs extend along the periphery of the tubes' plate which is the preferred configuration as it allows for a wider area for the application of the force, it enables the use of a wide area of the electrode capacitance, and it provides a high fill factor when a number of these sensors are connected in an array style.

It also could be apparent that the disclosed force sensor can be used as a weight measurement sensor as the weight is a force. It also can be used as a displacement sensor by detecting the amount of force applied and having prior knowledge of the stiffness of the rotor springs.

What is claimed is:

1. A touch-sensitive interface module, comprising:
   a. a flexible display panel to receive an input from a user;
   b. an array of MEMS piston-tube capacitive force sensors that is located beneath said flexible display panel;
   c. each said MEMS piston-tube capacitive force sensors comprising of:
      i. a fixed-electrode having an x- and y-axis defining an x-y plane, and a z-direction being perpendicular to the x-y plane, said fixed-electrode having a top surface parallel to the x-y plane, and a thickness along the z-direction, a stator-electrode-support-frame surrounding the fixed-electrode; an array of spaced apart piston electrodes extending from the top surface along said z-direction of the fixed-electrode, said pistons having vertical piston-walls and a piston-height; said pistons being electrically connected to each other and electrically addressable;
      ii. an moving-electrode having a non-moving rotor-support-frame surrounding the moving-electrode; an array of spaced apart tubes or apertures fabricated in the moving electrode, each said aperture having a vertical aperture-wall and a aperture-height, wherein said apertures being aligned with said pistons, and wherein each said aperture having an aperture opening sized and shaped to receive and interdigitate with each said piston without the piston-walls touching the aperture-walls, said apertures being electrically connected to each other but electrically isolated from the pistons;
      iii. a plurality of springs connecting said array of apertures to said non-moving rotor-support-frame;
      iv. an electrical insulation layer sandwiched between set said stator-support-frame and said rotor-support-frame to provide electrical separation between all said fixed-electrodes and said moving-electrodes;
   whereby each MEMS piston-tube capacitive force sensor is able to detect the x-y position and the amount of an external force along the out-of-plane axis (z-axis) applied to said flexible display panel, by means of capacitance change detection that is formed between the stator and the rotor electrodes of the individual force sensor.

2. The touch-sensitive interface module of claim 1, wherein said array of pistons comprising of four subarrays of pistons, the pistons in each subarray of pistons are electrically connected to each other and are electrically insulated from the pistons in other subarrays of pistons, and wherein each subarray of pistons being electrically addressable;
   whereby the position of and the force applied by a finger on the display panel is detected in each of the four corners of the sensor separately, thereby providing more operable function on a sensor.

3. The touch-sensitive interface module of claims 1, wherein some or all of the fixed-electrodes of each of said MEMS piston-tube force sensors are electrically isolated from each other and each one forms one or multiple subarray of fixed sensing electrodes, each said fixed sensing electrode, within a single MEMS piston-tube force sensor, is electrically isolated from other said sensing electrodes by utilizing an insulation layer and the pistons within each subarray of fixed sensing electrodes are electrically connected to each other thus forming a single capacitor with the tube electrodes in the moving-electrode,
   whereby a translation and/or a rotation of said moving electrode of each said MEMS piston-tube force sensor is detected using the variation in the capacitance within the electrically isolated subarrays of sensing electrodes.

4. The touch-sensitive interface module of claim 1, further having a force contact platform placed on each said moving-electrode to transmit a force applied on the flexible display panel to said moving-electrode, wherein said platform having means to limit the motion of the moving-electrodes to a desired maximum translational or rotational stroke and to avoid any short circuit between said pistons and tubes.

5. The touch-sensitive interface module of claim 1, wherein said fixed-electrodes comprise of an array of rectangular-shaped pistons and said moving electrodes comprise of an array of rectangular shaped tubes (apertures) sized to receive said pistons.

6. The touch-sensitive interface module of claim 1, wherein all of the moving-electrodes of said MEMS piston-tube force sensors have a single electrical polarity, and the fixed-electrodes are electrically isolated from each other.

7. The touch-sensitive interface module of claim 1, wherein all of the fixed-electrodes of said MEMS piston-tube force sensors have a single electrical polarity, and the moving-electrodes are electrically isolated from each other.

8. The touch-sensitive interface module of claim 1, wherein said flexible display is selected from a group consisting of an LCD or LED screen.

9. The touch-sensitive interface module of claim 1, wherein said electrical connections to the individual fixed- or moving-electrodes of the sensors is by a FCB or PCB.

10. The touch-sensitive interface module of claim 1, wherein each sensing electrode, within a single sensor, is electrically isolated from other sensing electrodes by utilizing the Buried Oxide (BOX) layer of an SOI wafer or any other dielectric (i.e. insulation) layer.

11. The touch-sensitive interface module of claim 1, the pistons within each single group (sensing electrode) are electrically connected to each other via a small thickness (height) layer forming a single capacitor with the moving (common) electrode in the upper structure.

12. The touch-sensitive interface module of claim 1, wherein the tubes have height (thickness) less that the pistons such that they fully engage without causing short circuit during the engagement of the pistons and the tubes while sensing.

13. The touch-sensitive interface module of claim 1, said force contact platform is placed on the rotor of the sensor and is made of any solid and lightweight materials such as glass or plastic.

14. The touch-sensitive interface module of claim 1, wherein a glass force contact platform could be attached to the rotor by means of ionic bonding during the fabrication of the sensor or by an adhesive.

* * * * *